United States Patent

[11] 3,563,131

| [72] | Inventor | Robert L. Ridley, Sr. |
|---|---|---|
| | | Palmetto, Ga. |
| [21] | Appl. No. | 825,103 |
| [22] | Filed | Apr. 23, 1969 |
| [45] | Patented | Feb. 16, 1971 |
| [73] | Assignee | Lockheed Aircraft Corporation |
| | | Burbank, Calif. |
| | | Continuation-in-part of application Ser. No. |
| | | 712,727, Mar. 13, 1968, now abandoned. |

[54] SPACER
1 Claim, 4 Drawing Figs.

[52] U.S. Cl. ................................................ 85/1, 85/32
[51] Int. Cl. ........................................... F16b 35/00, F16b 37/00
[50] Field of Search ........................................... 248/73, 68; 174/40.1; 24/81.3; 85/46

[56] References Cited
UNITED STATES PATENTS

| 2,684,025 | 7/1954 | Kurth | 85/1.5 |
| 937,577 | 10/1909 | Crump | 85/1 |
| 446,871 | 2/1891 | Lieb | 85/1S |
| 2,407,217 | 9/1946 | Banneyer | 248/68 |
| 2,413,772 | 1/1947 | Morehouse | 24/81.3 |

*Primary Examiner*—Edward C. Allen
*Attorneys*—John J. Sullivan and George C. Sullivan ABSTRACT: A spacer is provided for use in securing wire clamps in individual, stacked pairs so that only one pair of such clamps need be disconnected at a time. Opposite ends of the spacer terminate in bearing surfaces of precise dimension to assure the support of a cantilevered load. A threaded stud extends from one of these spacer ends and a threaded bore is formed in the other spacer end with matching threads so that the stud of one spacer can coact with the bore of another to accomplish stacking. The wall of the spacer between the bearing surfaces is configured to an optimum strength to weight ratio and a torque applying surface is associated with the bore end of the spacer.

PATENTED FEB 16 1971
3,563,131
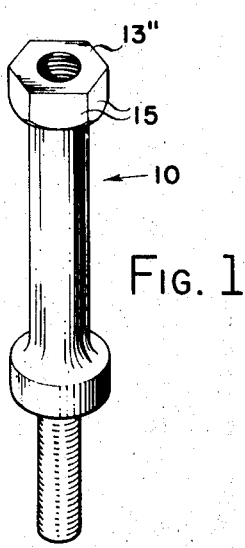
FIG. 1
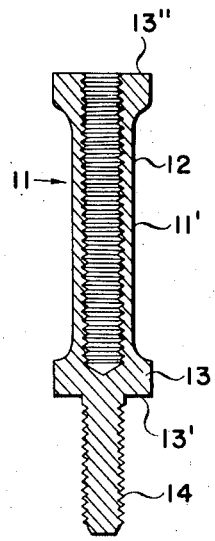
FIG. 2
FIG. 4 NEW
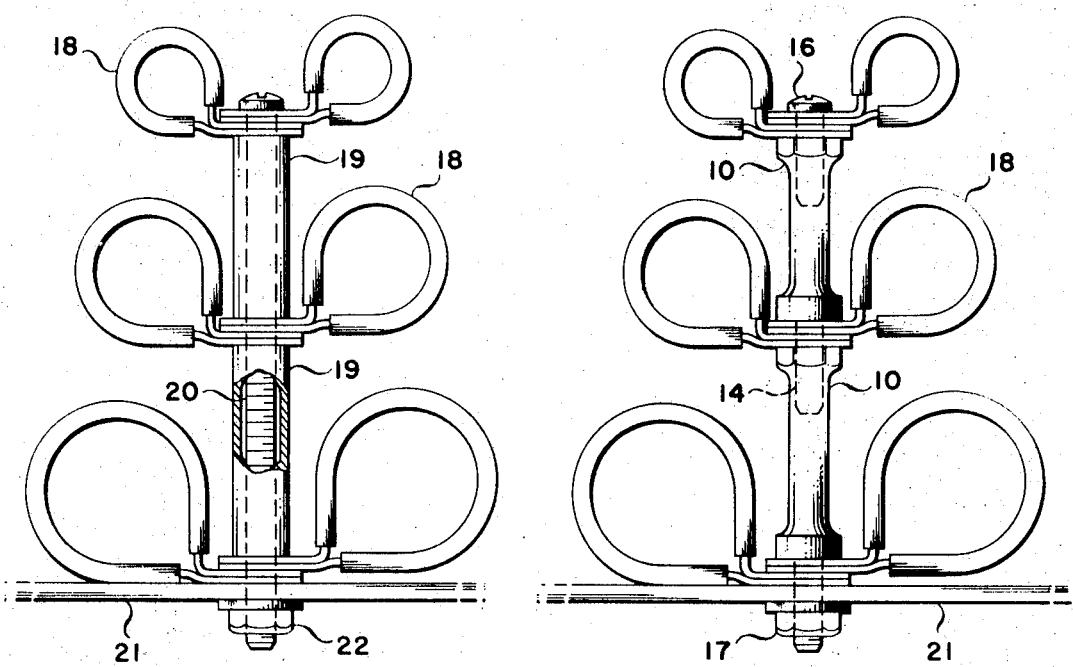
FIG. 3 OLD
INVENTOR.
ROBERT L. RIDLEY, SR.
BY George C. Sullivan
Agent
John J. Sullivan
Attorney

SPACER

This is a continuation-in-part of my copending application Ser. No. 712,727 filed Mars. 13, 1968, now abandoned.

This invention relates to spacers, e.e., rigid elements of selected length adapted to be interposed between adjacent parts to maintain them in separated relation, and more particularly to a spacer having external threads on one end and corresponding internal threads on the other end separated by a middle section of predetermined length terminating in a bearing surface of predetermined transverse dimension at its internally threaded end and a similar bearing surface adjacent the base of its externally threaded end. Preferably that portion of the spacer located between these bearing surfaces is of appreciably reduced transverse dimension and tool engaging means is provided adjacent the internally threaded end to facilitate an application of torque whereby a conventional screw and nut respectively are tightened and untightened in the internally and on the externally threaded ends of the spacer. Alternatively, due to the corresponding threads on the opposite ends of the spacer the externally threaded end of one such spacer is adapted to coact with and be connected to the internally threaded end of another such spacer whereby multiple axially aligned spacers may be assembled.

The spacer herein proposed has especial utility in the interconnection of clamps as are customarily employed in retaining or bundling groups of electrical wires or strands of wires extending through vehicles, particularly aircraft, facilitating the attachment of such wires to structure. Following current practice, these wire clamps are metal bands each of which encircles a group or bundle of such wires in snug parallel arrangement with the ends of the band brought together in overlapping relation and with holes therein which align for the passage therethrough of a bolt or other fastening means. The ends of these bands thus tend to spring apart and must be held in position during the fastening operation.

Where it is desired to stack multiple such clamps one on top of the other, spacers have been employed which comprise sleeves disposed between the band ends of clamps in adjacent tiers and through which a bolt may pass, the end of the bolt being adapted to connect a nut whereby all of the band ends are secured and the stacked clamps maintained in a fixed assembly. Thereafter, if and when it is required to remove and/or replace one or more of the wires, the bolt is withdrawn whereby the several clamps are allowed to spring apart. Thus, not only is the initial assembly of stacked clamps extremely difficult, but subsequent reassembly during normal maintenance is equally difficult and time consuming.

Moreover, such prior installation is objectionable in many applications where great numbers of such clamps are employed as is the case in the larger present day aircraft. In such instances, the weight of the single, continuous screw and the substantially coextensive sleeve or spacer in the quantities employed can be prohibitive.

The present invention is designed and intended to eliminate such objections of the prior art installation by the provision of a specially designed spacer adapted to be interposed between adjacent stacked clamps so as to permit each row or tier thereof to be attached and separated individually. Thus, the clamp or clamps comprising a single tier only are required to be held in position during the assembly and reassembly operation instead of the several tiers that comprise the entire stack as heretofore. At the same time, the design and construction of the spacer herein proposed is such that a substantial portion of the retaining screw shank is eliminated, whereby a relatively hollow or tubular bolt, in effect, may be employed across all of the assembled stacks. This results in an appreciable aggregate weight savings to the overall aircraft and additional weight savings are possible due to the instant spacer design by minimizing the major portion of the spacer wall thickness.

More specifically, this spacer comprises a shank of predetermined length constituting the spacer element which may be substantially tubular with an integral stud projecting therefrom which is externally threaded. The surface of the shank adjacent this stud, as well as at its opposite end, is provided with a radial bearing surface adapted to clampingly engage a corresponding surface of one of the parts or wire clamps to be secured thereby. At the opposite end, the shank is cut or otherwise formed with internal threads corresponding to those carried by the stud, whereby two such spacers may be interconnected in axial alignment. The peripheral surface of the shank of the spacer is formed or otherwise provided with projections to facilitate the application of torque thereto preferably by receiving and coacting with a conventional tool. Closing the ends of the outermost spacers thereby connected is a conventional screw at one end and a conventional nut at the other end so that the entire assembly constitutes in effect a bolt and nut, a large portion of which may be tubular in given applications.

With the above and other objects in view as will be apparent, this invention consists in construction, combination, and arrangement of parts all as hereinafter more fully described, claimed, and illustrated in the accompanying drawings wherein:

FIG. 1 is an isometric view of a spacer designed and constructed in accordance with the teachings hereof;

FIG. 2 is a longitudinal section taken through the spacer illustrated in FIG. 1 to show the corresponding internal and external threads on opposite ends thereof and the central bore of the shank in the extreme case, the length of this bore being varied in accordance with material, application, etc., FIG. 3 is a side elevational view showing a typical prior art or OLD installation wherein a stack is made up of multiple tiers of wire clamps separated by conventional sleeves through the entire length of which a typical bolt or machine screw passes and is mounted on and holds the several clamps in assembly by means of a nut coacting with the outer end of the screw and an appropriate supporting structure; and FIG. 4 is a similar view of a NEW assembly employing the instant spacer as illustrated in FIGS. 1 and 2.

Referring more specifically to the drawings, 10 designates a threaded spacer as herein contemplated. This spacer is formed by a shank portion 11 which is internally threaded as at 12 at one end and closed as at 13 at the other end from which a threaded stud portion 14 extends preferably as an integral part thereof. As clearly illustrated in the drawings, for reasons to become more apparent the shank portion 11 is preferably at least twice the length of the stud portion 14 and in no case less than one and one-half times the stud length. Also, the closed end 13 terminates in a radial bearing surface 13' which is disposed perpendicular to the longitudinal centerline of the spacer 10. Preferably this surface 13' has an effective overall dimension equal to approximately one-third the length of the shank portion 11.

The opposite threaded or open end twelve of the shank 11 terminates in a similar bearing surface 13'' and is preferably formed with flat peripheral surfaces 15 establishing a hexagon adapted to coact with a conventional wrench (not shown) whereby torque forces may be readily applied on the spacer 10. The portion of the shank 11 between the bearing surfaces 13' and 13'' may be reduced peripherally as at 11' whereby the strength to weight ratio is optimized. Thus, while the required, predetermined overall dimension of each bearing surface 13' and 13'' is maintained, the shank portion 11' is made to approximate the strength of the stud 14 as indicated by making the effective cross-sectional area or total wall thickness of the shank portion 11' substantially equal to the transverse dimension of the stud 14 (FIG. 2). This is especially important where the heavier metals are employed in the spacer or where the strength requirements necessitate unduly large transverse dimensions of the spacer.

The internal threads associated with the shank portion 11 and the external threads on the stud 14 correspond so that the stud portion of one such spacer may be threaded into the sleeve portion of an associated adjacent spacer. As shown in FIG. 4, the conventional machine screw 16 and nut 17 are adapted to coact with the internally threaded and externally threaded ends respectively of the spacer 10. The head of this screw 16 and the nut 17 are adapted to work in opposition one to the other and serve as terminal retaining means for the associated tiers of clamps in the stack.

Referring particularly to FIG. 3, a typical prior art or OLD installation is accomplished by placing conventional wire clamps 18 in pairs with their mounting holes aligned and a sleeve spacer 19 interposed between each row or tier of such pairs. A continuous length bolt 20 is then inserted through the several aligned sleeves 19 and clamp holes and through the hole in a supporting bracket 21 or other member where it is secured by a nut 22. The several tiers of clamps 18 are thereby assembled in a fixed installation. In the process, however, it is required to retain all of the several clamps 18 against their normal spring action while the nut 22 is being secured on the end of the bolt 20.

Subsequently, if it is required to replace one or more of the wires or bundles in any one or more of the clamps 18, it is necessary to remove the nut 22 from the bolt 20. At this time, the several clamps 18 spring apart and must eventually be reassembled and secured. Even in the most accessible of installations, it is extremely difficult for a single person such as a mechanic to apply the necessary force to hold all of the clamps 18 at one time while thus connecting the nut 22.

Employing the present threaded spacer 10 as can be seen from FIG. 4, the connection of the screw 16 and nut 17 in conjunction with one or more spacers 10 is such that either one may be removed independently of the other and at no time is it necessary to hold or restrain more than a single pair of the clamps 18, i.e., the clamps 18 in each row or tier. Each intermediate spacer 10 coacts with each adjacent spacer 10 or screw 16 or nut 17 as the case may be to maintain the associated tier of clamps 18 intact. Thus, to replace a single wire of one of the bundles, it is only necessary to remove the clamp or clamps 18 down to that particular row or tier of clamps and no farther. The reassembly is readily effected by resecuring the clamps 18 one pair or one tier at a time as opposed to the entire stack or several tiers as heretofore.

The dimensions of the bearing surfaces 13' and 13" of each spacer 10 will vary with each application. In any case it is anticipated that it must be such as required to support a predetermined load as determined by the mass of the contained wires cantilevered a predetermined distance from the support 21 which will be established by the length of the spacer 10. In the aircraft application, the dimensions of the bearing surfaces 13' and 13" relative to the shank length is especially critical due to the further complications of oscillatory forces resulting from external loads (measured in G's) acting on the aircraft which also must be taken into consideration.

While a particular embodiment of the invention has been herein illustrated and described, it is to be understood that this is for the purpose of assuring a clear understanding of the invention. It will be obvious to those skilled in the art that various changes and modifications may be made without departing from the invention. It is intended to cover in the appended claims all such variations as fairly fall within the true spirit and scope of this invention.

I claim:

1. A spacer comprising a tubular shank open at one end and having internal threads and closed at the other end and having a stud with corresponding external threads extending therefrom, a right angularly disposed bearing surface at each end of said shank defined by a peripheral surface, the portion of said shank intermediate said peripheral surfaces being reduced so as to have a substantially uniform wall thickness at each point in the length of said portion establishing a cross sectional wall area substantially equal to that of said stud, the length of said reduced shank portion constituting the majority of said shank length and the length of said shank being at least one and one-half times that of said externally threaded stud, and each said bearing surface having an overall dimension on the order of one-third the length of said shank.